G. W. NATION.
SEED DRILL.
APPLICATION FILED DEC. 11, 1908.

934,828.

Patented Sept. 21, 1909.
2 SHEETS—SHEET 1.

WITNESSES

INVENTOR
GEORGE W. NATION,
BY 
ATTORNEYS

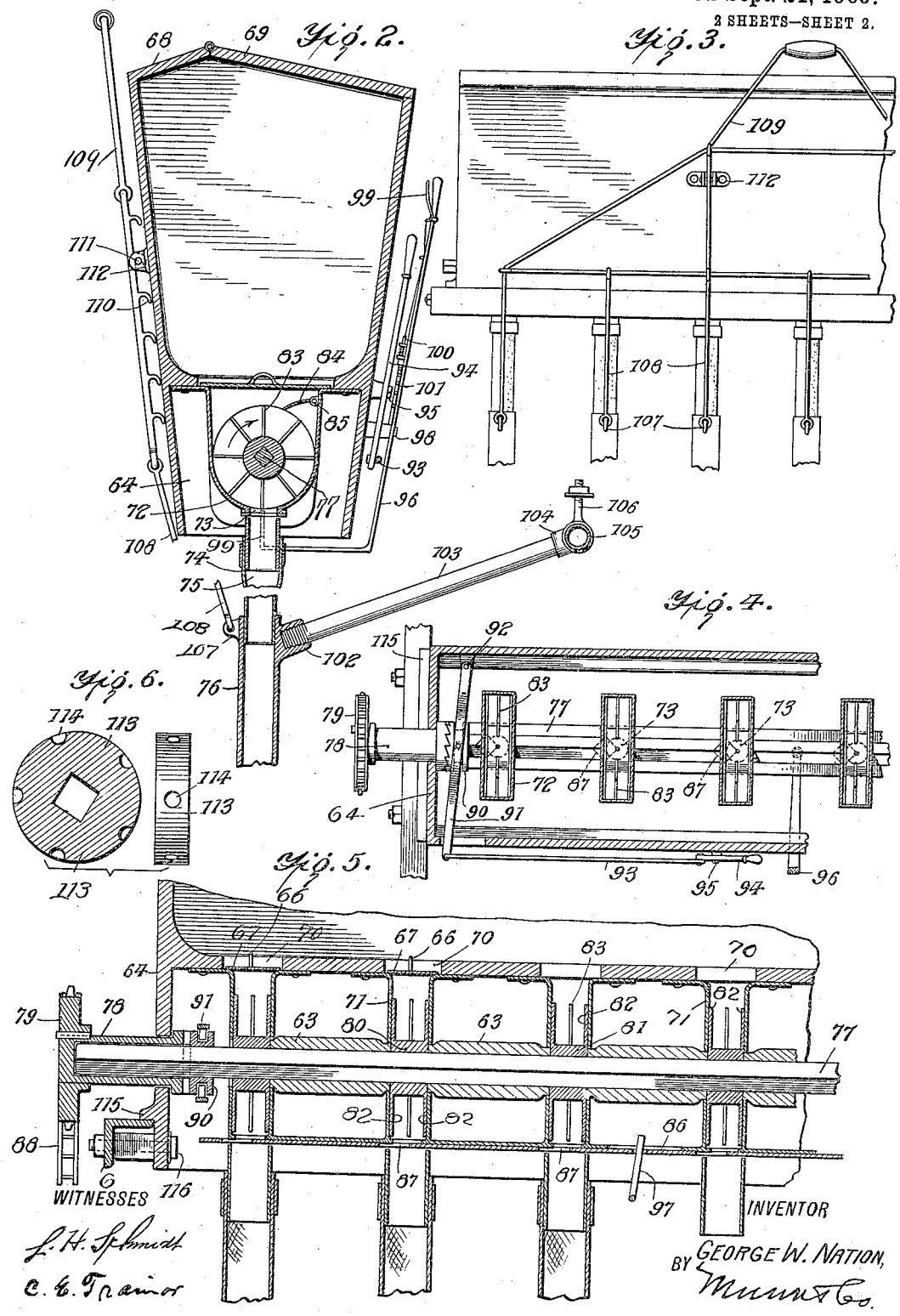

UNITED STATES PATENT OFFICE.

GEORGE W. NATION, OF ALLIANCE, NEBRASKA.

SEED-DRILL.

934,828.

Specification of Letters Patent. Patented Sept. 21, 1909.

Application filed December 11, 1908. Serial No. 466,977.

*To all whom it may concern:*

Be it known that I, GEORGE W. NATION, a citizen of the United States, and a resident of Alliance, in the county of Boxbutte and State of Nebraska, have invented certain new and useful Improvements in Seed-Drills, of which the following is a specification.

My invention is an improvement in seed drills, and consists in certain novel constructions and combinations of parts hereinafter described and claimed.

The object of the invention is to produce a seeding attachment especially adapted for use with my improved agricultural implement shown and described in my co-pending application Serial No. 466,978, filed Dec. 11, 1908.

Figure 1:
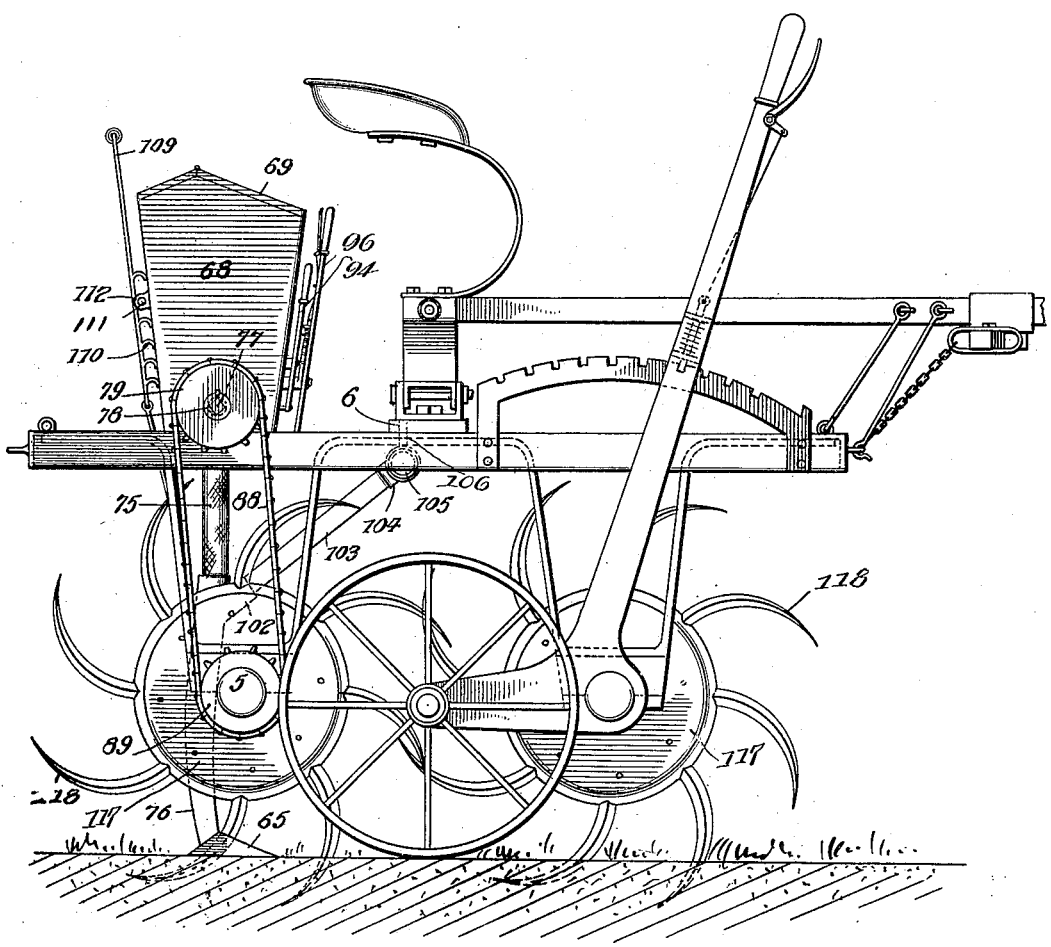
Figure 1:

Referring to the drawings forming a part hereof—Figure 1 is an end view of the improvement applied to the agricultural implement; Fig. 2 is a transverse section through the drill; Fig. 3 is a partial rear view thereof; Fig. 4 is a partial horizontal section; Fig. 5 is a partial longitudinal section, and Fig. 6 is a side and edge view of another form of dropping roll.

The present embodiment of the invention comprises a seed box 68 having a hinged lid 69, and provided in its bottom with a series of transverse slots 70 and with an outlet spout 71 encircling each of the said slots and secured to the bottom of the box. A cover 67 is provided with a handle 66 for manipulating the same, and is adapted to close one or more of the slots as shown in Fig. 5, as for instance, when it is desired to drill rows a greater distance apart.

The lower end of each of the spouts 71 is rounded as shown at 72 to form a contracted opening 73, and a chute 74 leads from the contracted opening and delivers into a hose 75, which in turn delivers into a drill shoe 76 provided with the usual furrow opener or plow 65.

A square shaft 77 passes through each of the outlet spouts transversely thereof, and the ends of the shaft are journaled in hubs 78 of sprocket wheels 79, and the hubs are journaled in the downwardly extended ends 64 of the seed box as shown in Fig. 5.

A dropping wheel 80 is secured on the shaft within each of the outlet spouts, and each of the dropping wheels consists of the hub portions 81, on the shaft, and spaced annular flanges 82 between which are arranged a plurality of radial rods or stirrers 83. The flanges 82 move against the sides of the outlet spout as clearly shown in Fig. 5, and spacing sleeves 63 are arranged between the dropping wheels. The periphery of each dropping wheel is engaged by a scraper 84 hinged as at 85 in the chute, and below each of the outlet spouts and between the same and the chute, is movable a slide 86, which is provided with openings 87 therethrough normally registering with the openings of the outlet spout, the slide being adapted to close the slots when it is moved in one direction. The said slide is moved by means of a lever 96, having an angular portion 97 engaging an opening in the slot, and pivoted to the seed box as at 98, the lever being provided with a grip 99 which operates a spring pressed tooth 100, normally in engagement with a toothed quadrant 101 on the seed box.

The sprocket wheels 79 before mentioned are connected by sprocket chains 88 with sprocket wheels 89 on the ends of the shafts 5 belonging to the improved implement before mentioned, and the sprocket wheels are adapted to be connected with the shaft by means of a clutch sleeve 90 slidable on the shaft and engaged by the fork of a lever 91, which is pivoted as at 92 to the seed box, and has its other end connected by a link 93 with one end of an operating lever 94, which lever is pivoted to the casing as at 95.

Sundry of the shoes 76 are provided with internally threaded bosses 102 which are engaged by the threaded ends of pipes 103, whose other ends screw into tees 104 on a longitudinal pipe 105, which is supported at suitable intervals by eye-bolts 106 passing through the longitudinal bars 6 of the frame of the improved agricultural implement.

Each of the shoes is provided on its rear side with a lug 107 which is engaged by a link 108 and all the links are connected directly or indirectly to a handle 109, whereby they may be raised and lowered in unison. The handle is yoke shaped and the arms thereof are provided with teeth 110, which are adapted to engage pins 111 of the forks 112 secured to the seed box whereby to retain the shoes in their adjusted position.

The modified form of dropping wheel in Fig. 6, consists of a disk 113 having in its peripheral surface spaced recesses 114 for receiving the grain, and the said disks are arranged within the outlet chutes in the same manner as the dropping wheels before described.

The depending ends 64 of the seed box are provided with ledges 115, which rest upon the frame 6 before mentioned, and the box is secured to the frame by means of bolts 116.

In operation the framework 6 being drawn through the field in any suitable manner, the disks 117 which are provided with radial sickle shaped blades 118 stir up the soil, and prepare it for being furrowed by the furrow openers of the drilling attachment. The rotation of the dropping wheels permits the grain to move in predetermined and regular quantities through the shoes into the furrow, and the shoes may be adjusted to any desired position by means of the handle 109.

I claim:

1. In a device of the class described, a drilling device comprising a seed box having a plurality of outlet chutes, drilling shoes with which the chutes communicate, a dropping wheel in each of the chutes, a common means for operating all of the dropping wheels, each of said wheels consisting of a hub, provided with annular spaced flanges, radial stirring rods projecting from the hubs between the flanges, means for closing the communication between any of said chutes and the seed box, and means for closing the communication of all of the chutes with the drilling shoes.

2. In a device of the class described, a drilling device comprising a seed box having a plurality of outlet chutes, drilling shoes with which the chutes communicate, a dropping wheel in each of the chutes, and a common means for operating all of the dropping wheels, each of said wheels consisting of a hub provided with annular spaced flanges, radial stirring rods projecting from the hubs between the flanges, and means for closing all of the outlet chutes in unison.

3. In a device of the class described, a drilling device comprising a seed box having a plurality of outlet chutes, drilling shoes with which the chutes communicate, a dropping wheel in each of the chutes, a common means for operating all of the dropping wheels, each of said wheels consisting of a hub provided with annular spaced flanges, and radial stirring rods projecting from the hubs between the flanges.

4. In a device of the class described, a seed box having a plurality of transverse slots in the bottom thereof, dropping devices below the slots, and removable covers for the slots within the seed box.

5. In a device of the class described, a seed box having in the bottom thereof a plurality of transverse slots, an outlet chute encircling each of the slots, a dropping wheel within each chute, and a pivotally mounted scraper engaging the peripheral surface of each dropping wheel.

6. In a device of the class described, a seed box having a plurality of transverse slots, an outlet chute encircling each slot, a dropping wheel in each chute, each of said wheels comprising a hub extending between the walls of the chute and having annular flanges moving against the walls.

7. In a device of the class described, a seed box having a plurality of transverse slots, an outlet chute encircling each slot, a dropping wheel in each chute, each of said wheels comprising a hub extending between the walls of the chute and having annular flanges moving against the walls, and stirring rods arranged radial to the hubs and between the flanges.

GEORGE W. NATION.

Witnesses:
SOLON C. KEMON,
C. E. TRAINOR.